No. 611,305. Patented Sept. 27, 1898.
C. O. WESCOTT.
PIPE LOCK.
(Application filed Jan. 25, 1898.)

(No Model.)

Witnesses:
Richard Paul.
M. C. Noonan

Inventor:
Charles O. Wescott.
By Paul & Hawley
his attorneys.

UNITED STATES PATENT OFFICE.

CHARLES O. WESCOTT, OF FARMINGTON, MINNESOTA.

PIPE-LOCK.

SPECIFICATION forming part of Letters Patent No. 611,305, dated September 27, 1898.

Application filed January 25, 1898. Serial No. 667,856. (No model.)

*To all whom it may concern:*

Be it known that I, CHARLES O. WESCOTT, of Farmington, Dakota county, Minnesota, have invented certain new and useful Improvements in Pipe-Locks, of which the following is a specification.

My invention relates to devices for securing the sections of sheet-metal pipes together; and the object of the invention is to provide means whereby the telescoping ends of sheet-metal pipes may be securely locked together.

A further object is to provide a locking device which will permit the sections of pipe to be separated whenever it is desired to change the position of the sections or to take down the pipe.

The invention consists generally in a pipe having telescoping sections, said sections being provided with slots to receive a stud or lug upon an adjoining section and means for locking said studs within said slots, all as hereinafter described, and particularly pointed out in the claims.

Figure 6:
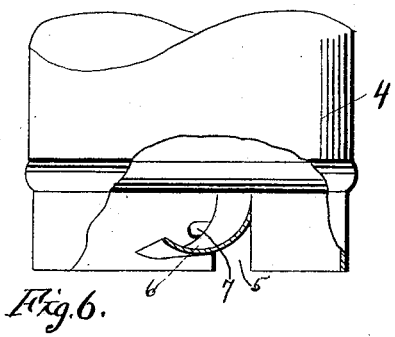
Figure 2:
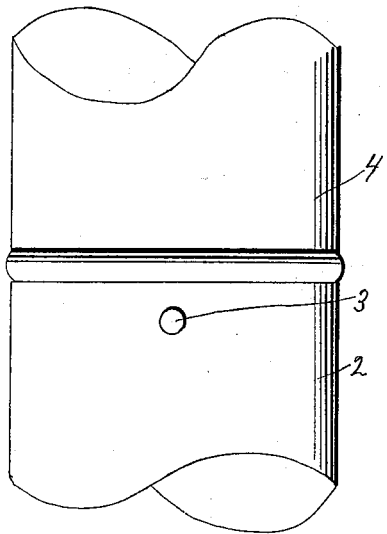
Figure 4:
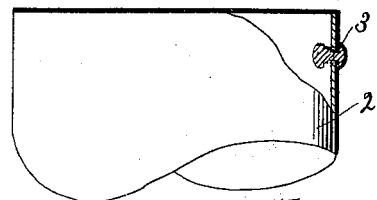
Figure 3:
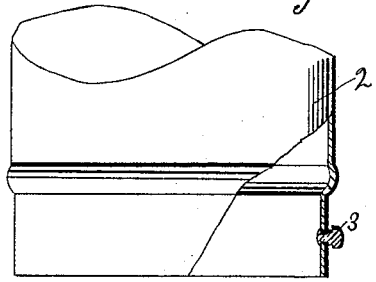
Figure 1:
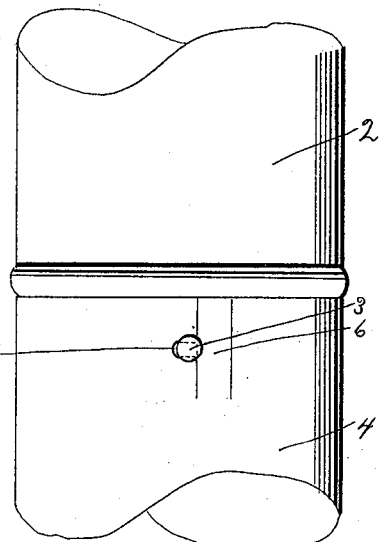
Figure 5:
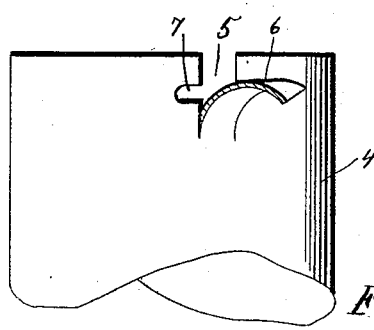

In the accompanying drawings, forming part of this specification, Figure 1 is a plan view of a portion of a pipe, showing the adjoining sections locked together. Fig. 2 is a similar view showing the stud or lug arranged upon the pipe-sections. Fig. 3 is a view of a portion of the pipe, its wall being broken away to show the stud or lug in section. Fig. 4 is a similar view showing the stud or lug in reverse position. Fig. 5 is a detail of the locking device. Fig. 6 is a similar view, the position of the locking device being reversed.

In the drawings, 2 represents a section of stovepipe having in its wall, near one end, a lug or stud 3, having a flanged outer end and its inner end secured in any suitable manner to the pipe.

4 represents the adjoining section having a longitudinal slot 5, formed by turning back the integral lip or tongue 6, and also provided with a short slot 7, leading from slot 5 and substantially at right angles thereto. When the ends of two sections of pipe are telescoped, the stud or lug 3 will enter the slot 5 until it reaches a point opposite the opening to the slot 7, when by slightly turning either of the pipe-sections the stud will enter the slot 7, and the sections will thereby be secured together. To lock the stud within the slot 7, I bend the tongue 6 back to its original position to cover the slot 5, and I may turn one of the sections slightly, so that the flanged end of the stud will engage and overlap the edge of said tongue, thereby preventing the same from turning back out of the slot 5 until such time as it is desired to separate the pipe-sections. At such time the stud is disengaged from the edge of the tongue 6, and said strip being turned back the telescoping ends of the section may then be readily separated. As shown in Fig. 4, the position of the stud or lug in the pipe may be reversed, so that the flanged end will be inside the pipe, and when arranged in this position the tongue 6 will be bent in, and when it is desired to lock the sections together the operator will reach into the pipe-section and bend the tongue back, so as to cover the slot 5 and close the slot 7, as heretofore described.

The device is particularly applicable for use with smoke-pipes; but I do not confine it to this class of pipes, as it may be used on pipes that take the hot air from furnaces or wherever it is desired to secure the telescoping sections of sheet-metal pipes together.

Having thus described my invention, I claim as new and desire to secure by Letters Patent—

1. The combination, with a pipe-section having a pin or stud at or near its end, of a second pipe-section having a slot to receive said pin or stud when the sections are joined together, and means for closing said slot and locking said stud therein, substantially as described.

2. The combination, with a pipe-section having a pin or stud at or near its end, of a second pipe-section having a slot provided with a lateral extension, and a tongue adapted to close said slot and lock said pin within said extension, substantially as described.

3. The combination, with a pipe-section having a pin or stud at or near its end, of a second pipe-section having a slot to receive said pin or stud when the sections are joined together, and a tongue integral with said second section and adapted to close said slot and lock said pin therein, substantially as described.

In testimony whereof I have hereunto set my hand this 15th day of January, A. D. 1898.

CHARLES O. WESCOTT.

In presence of—
WM. COOK,
CHARLES ROWELL.